(12) United States Patent
Luo et al.

(10) Patent No.: US 8,052,224 B2
(45) Date of Patent: Nov. 8, 2011

(54) LIGHTWEIGHT ALUMINUM WHEEL WITH MAGNESIUM RIM

(75) Inventors: Aihua A. Luo, Troy, MI (US); Anil K. Sachdev, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 43 days.

(21) Appl. No.: 12/267,776

(22) Filed: Nov. 10, 2008

(65) Prior Publication Data

US 2010/0117443 A1    May 13, 2010

(51) Int. Cl.
*B60B 3/10*    (2006.01)
(52) U.S. Cl. ............ 301/63.103; 228/114.5; 427/328
(58) Field of Classification Search ........... 301/10.1, 301/11.1, 11.3, 14, 63.101–63.103, 64.304, 301/64.306
See application file for complete search history.

(56) References Cited

U.S. PATENT DOCUMENTS

| | | | |
|---|---|---|---|
| 4,341,425 A * | 7/1982 | Streicher et al. | 301/63.102 |
| 4,763,392 A * | 8/1988 | Fogal et al. | 427/327 |
| 4,997,235 A * | 3/1991 | Braungart | 301/11.1 |
| 5,454,628 A | 10/1995 | Maiworm et al. | |
| 5,526,977 A * | 6/1996 | Wei | 228/208 |
| 5,718,485 A * | 2/1998 | Stach | 301/63.102 |
| 6,106,077 A | 8/2000 | Kluge et al. | |
| 6,152,351 A * | 11/2000 | Separautzki et al. | 228/114 |
| 6,296,319 B1 | 10/2001 | Hummel et al. | |
| 7,073,871 B2 * | 7/2006 | Hamada | 301/5.24 |
| 2001/0048241 A1 | 12/2001 | Yoshimura | |
| 2002/0117888 A1 | 8/2002 | Wurft | |
| 2005/0067229 A1 | 3/2005 | Gabourie | |
| 2005/0184578 A1 | 8/2005 | Fielden | |
| 2008/0309151 A1 * | 12/2008 | Kleber et al. | 301/37.31 |

* cited by examiner

Primary Examiner — Jason Bellinger
(74) Attorney, Agent, or Firm — Reising Ethington P.C.

(57) ABSTRACT

One embodiment includes a wheel including a first portion including magnesium, the first portion including at least a rim; a second portion including aluminum; and an interface where the first portion and the second portion contact each other.

14 Claims, 3 Drawing Sheets

US 8,052,224 B2

LIGHTWEIGHT ALUMINUM WHEEL WITH MAGNESIUM RIM

TECHNICAL FIELD

The field to which the disclosure generally relates includes lightweight wheels and methods of making the same.

BACKGROUND

Current aluminum or magnesium wheels (cast or forged) are anodized, chrome-coated, and/or painted.

SUMMARY OF EXEMPLARY EMBODIMENTS OF THE INVENTION

One embodiment includes a wheel including a first portion comprising magnesium, wherein the first portion comprises at least a rim; a second portion comprising aluminum; and an interface where the first portion and the second portion contact each other.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

Wheels including lightweight materials such as magnesium may reduce unsprung mass, shorten braking distances of vehicles, deliver higher acceleration rates, and improve gas mileage. For example, a wheel made entirely of magnesium may reduce the unsprung mass of the wheel by 25% compared to an aluminum wheel and by 60% compared to a steel wheel. The high damping capacity of magnesium alloys may also allow for vibrations caused by road imperfections to be more effectively reduced.

Figure 1:
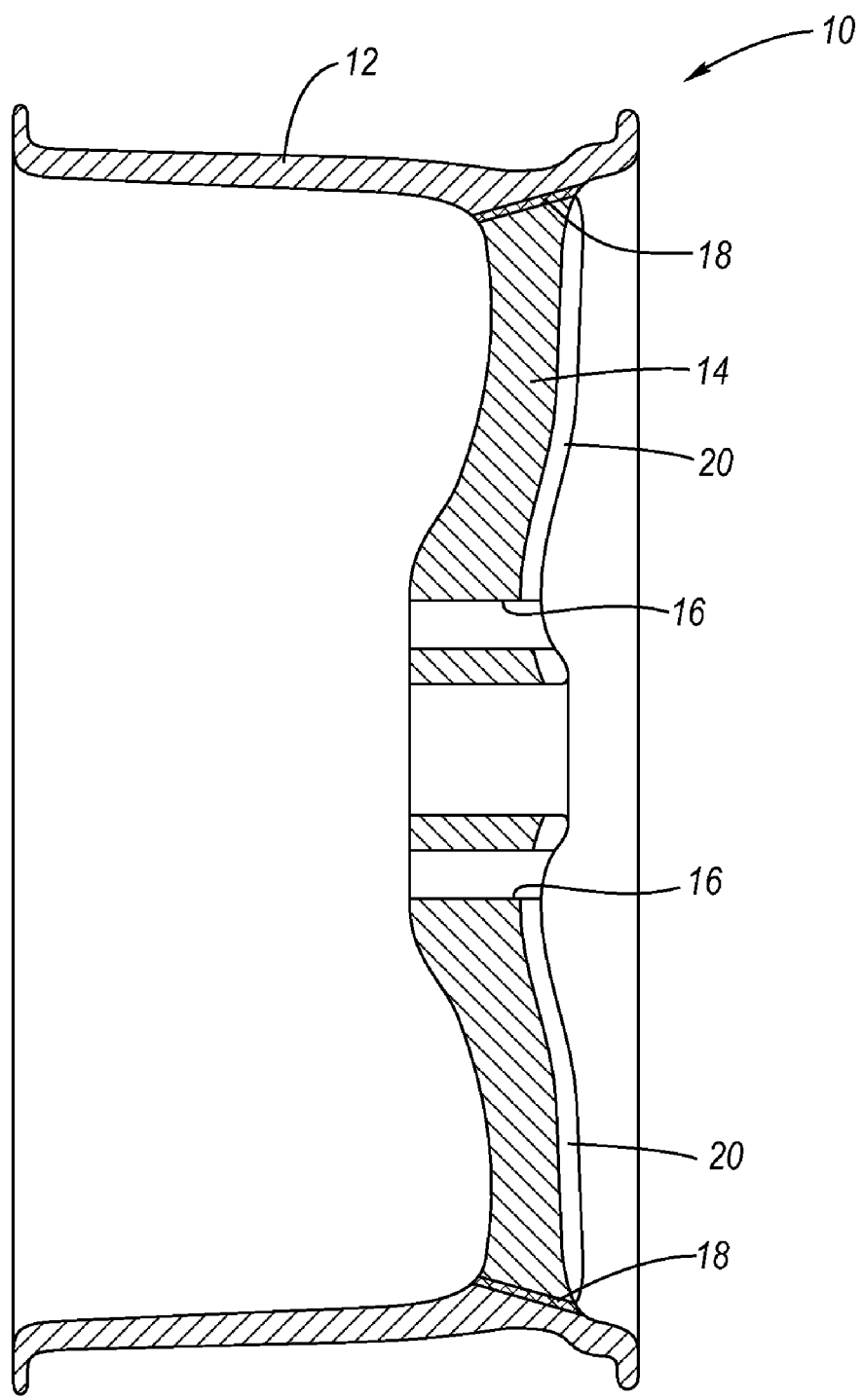
FIG. 1 is wheel according to one embodiment of the invention.

Referring to FIG. 1, a wheel 10 includes a rim 12 and a disk 14, which mounts to an axle hub (not shown) using bolts extending through bolt holes 16 in the disk 14. The rim 12 and the disk 14 meet at an interface or intersection 18. In various embodiments, the wheel 10 may have any combination of the rim 12 comprising aluminum or magnesium and the disk 14 comprising aluminum or magnesium.

In one embodiment, the rim 12 may be a magnesium alloy and the disk 14 may be an aluminum alloy. When the rim 12 is a magnesium alloy and the disk 14 is an aluminum alloy, the disk 14 may carry the hub load and permit styling surface design and polish and the use of steel bolts for hub mounting. In another embodiment, the disk 14 may be a magnesium alloy, and the rim 12 may be an aluminum alloy. The combination of aluminum and magnesium may reduce the weight of the wheel 10. The magnesium rim 12 may reduce the unsprung mass and improve the performance of the wheel 10.

In yet another embodiment, the rim 12 may a first magnesium alloy and the disk 14 may be a second magnesium alloy. The first and second magnesium alloys may be the same magnesium alloy, or they may be different magnesium alloys.

Figure 2:
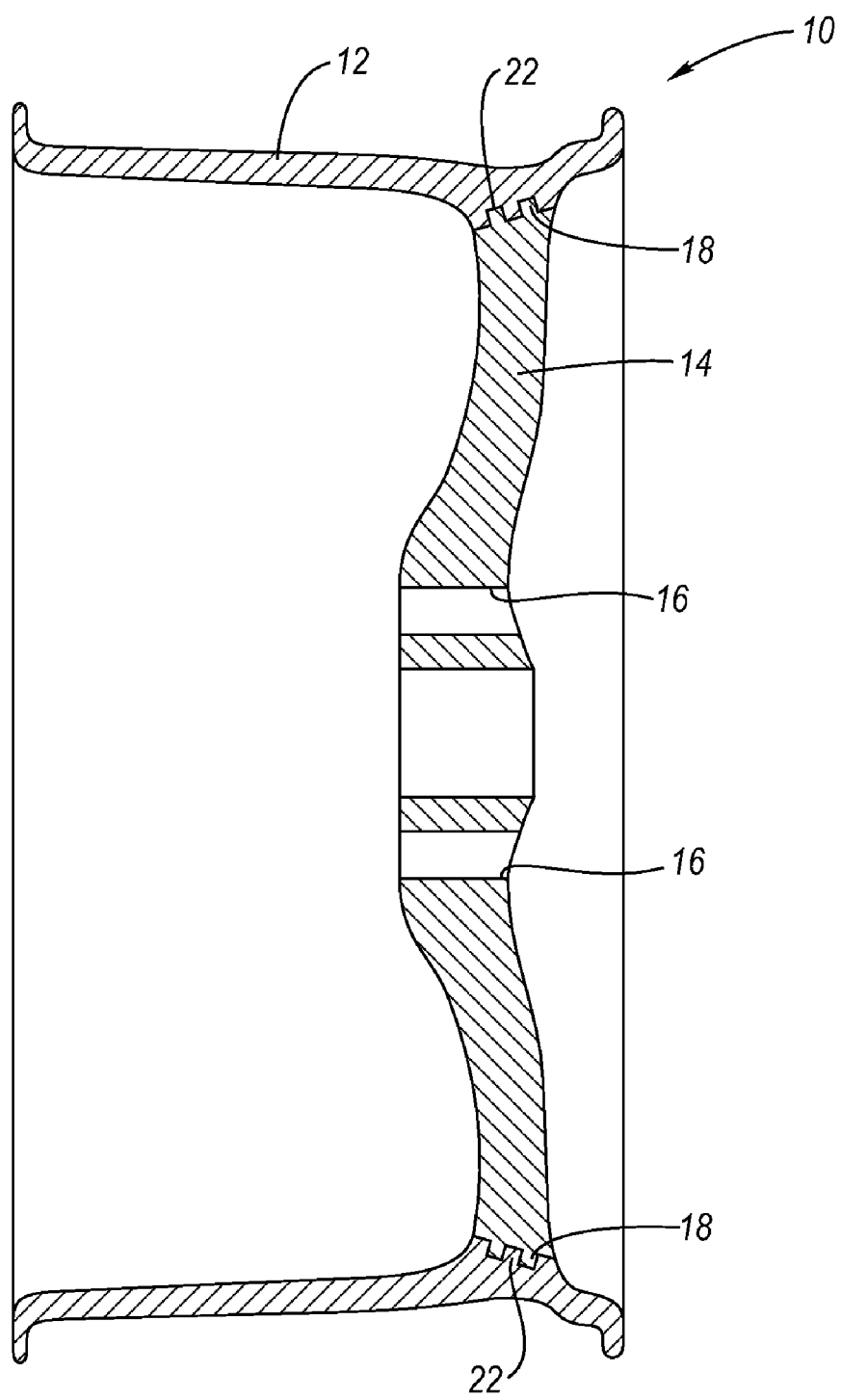
FIG. 2 is wheel according to one embodiment of the invention.
Figure 3:
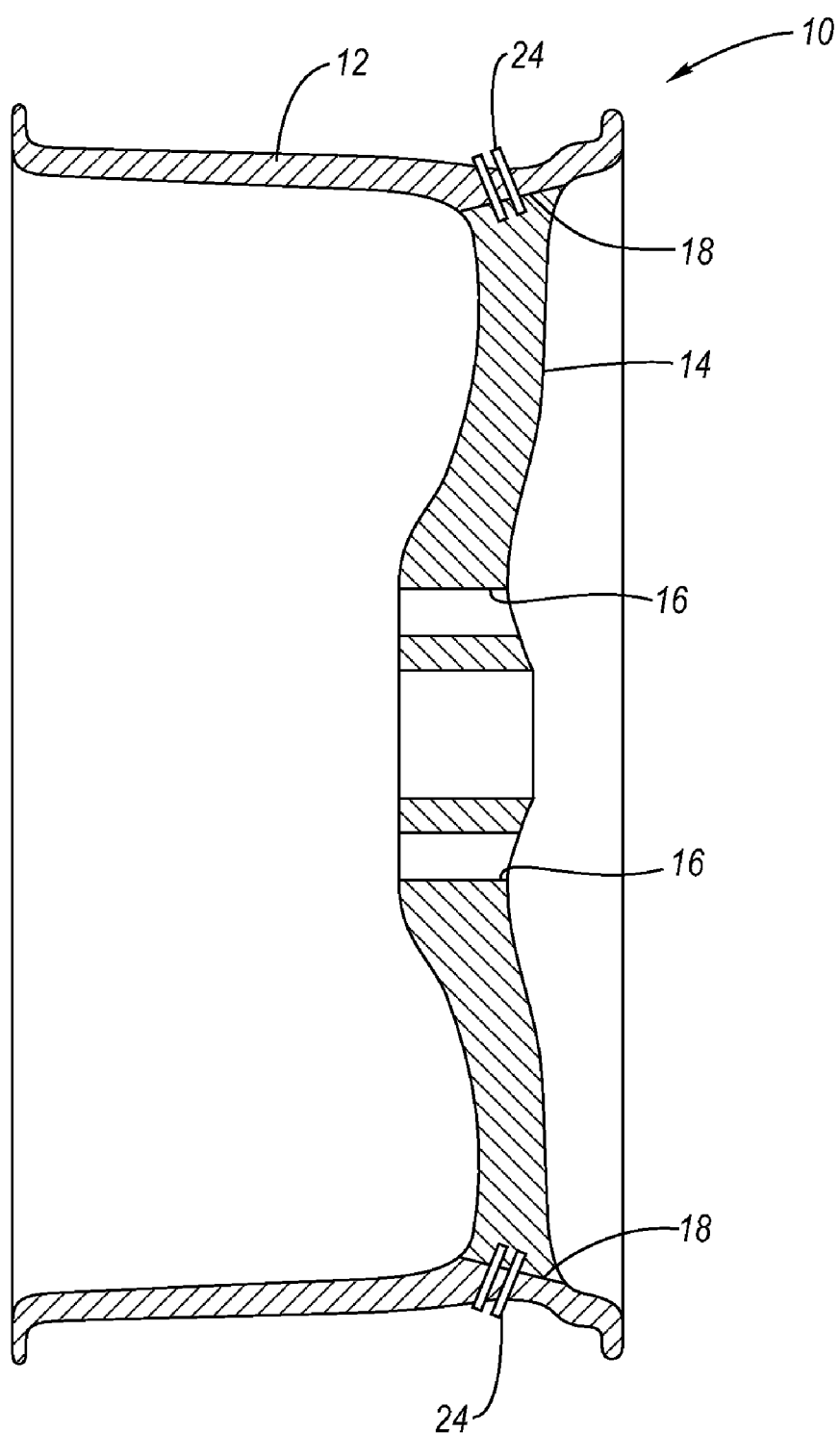
FIG. 3 is wheel according to one embodiment of the invention.

In one embodiment, the rim 12 and the disk 14 of the wheel 10 are metallurgically bonded at the interface 18. Referring to FIG. 2, in another embodiment, the interface 18 may include a mechanical interlock 22 of the rim 12 and the disk 14, for example using interlocking teeth. The interface 18 may also include both a mechanical interlock and a metallurgical bond of the rim 12 and the disk 14. Referring to FIG. 3, in another embodiment, the interface 18 of the rim 12 and the disk 14 may include at least one fastener 24. The fastener may include one of a high-strength aluminum bolt, a coated steel bolt, or a rivet. In another embodiment, the interface 18 may include an adhesive that bonds the rim 12 and the disk 14, for example an epoxy-based impact-resistant adhesive.

In various embodiments, a layer 20 may be provided over at least a portion of the wheel 10. The layer 20 may include an aluminum alloy. The layer 20 may have a sufficient thickness to allow for polishing, damage resistance, or corrosion resistance. For example, the layer 20 may have a thickness of a few microns to 1 mm. In one embodiment, the layer 20 may have a thickness of about 100 μm to 200 μm. In select embodiments, the layer may include at least one of an aluminum-silicon (Al—Si) based alloy, an aluminum-magnesium (Al—Mg) based alloy, aluminum-magnesium-silicon (Al—Mg—Si) based alloy, or other corrosion-resistant alloys. The layer 20 may be polished. In another embodiment, the layer 20 may include surface designs. The layer 20 may increase the resistance of the wheel 10 to corrosion or other damage, wear, or dents.

In one embodiment, the layer 20 may be provided over the entire wheel 10. Or the layer 20 may be provided only over at least a portion of the rim 12. Or the layer 20 may be provided only over at least a portion of the disk 14. Or the layer 20 may be provided over a portion of the rim 12 and the disk 14. As shown in FIG. 1, the layer 20 may be provided over the entire surface of the disk 14. Or the layer 20 may be provided over any combination of the rim 12 comprising aluminum or magnesium and the disk 14 comprising aluminum or magnesium. The layer 20 may be a different alloy or the same alloy as the rim 12 and/or the disk 14. For example, in one embodiment the rim 12 comprises aluminum and the disk 14 comprises magnesium, and the layer 20 may be provided over the rim 12, or the disk 14, or the rim 12 and the disk 14. In another embodiment, the rim 12 comprises magnesium and the disk 14 comprises aluminum, and the layer 20 may be provided over the rim 12, or the disk 14, or the rim 12 and the disk 14. In another embodiment, the rim 12 and the disk 14 comprise magnesium and the layer 20 may be provided over the rim 12, or the disk 14, or the rim 12 and the disk 14.

In one embodiment, a method of making a lightweight wheel includes forming the layer 20 over at least a portion of the wheel 10. Forming the layer 20 may include at least one of cold spraying, dipping in a molten aluminum alloy bath, spraying with an aluminum alloy, arc wire spraying, powder spraying, wire flame spraying, plasma spraying, high velocity oxy-fuel spraying, cold spraying, or detonation guy spraying. These methods of forming the layer 20 may be performed at varying temperatures and velocities. For example, in one embodiment, the cold spraying of aluminum alloy particles over at least a portion of the wheel 10 may occur at a very high velocity, 300 to 1200 m/s, and at a temperature of 0° C. to 800° C. The forming of the layer 20 may provide a strong metallurgical bond between the layer 20 and the wheel 10. The layer 20 may increase the resistance of the wheel 10 to corrosion or other damage or wear.

In one embodiment, the method may also include polishing the layer 20. In another embodiment, the method may include applying a surface design to the layer 20.

Various embodiments include a method of making a lightweight wheel having any combination of the rim 12 comprising aluminum or magnesium and the disk 14 comprising aluminum or magnesium. For example, the rim 12 may be an aluminum alloy and the disk 14 may be a magnesium alloy; or the rim 12 may be a magnesium alloy and the disk 14 may be an aluminum alloy; or the rim 12 may a first magnesium alloy and the disk 14 may be a second magnesium alloy, where the first and second magnesium alloys are the same or different.

The method according to one embodiment includes casting the rim 12 over the disk 14. One embodiment includes placing the aluminum disk 14 in a die and casting molten magnesium or magnesium alloy over the aluminum disk 14 to form the magnesium rim 12. During the casting process, the molten magnesium solidifies to form the interface 18 including a metallurgical bond between the aluminum and magnesium. In another embodiment, the aluminum disk 14 may include teeth, and when the magnesium is cast over the disk 14, the interface 18 is formed and includes mechanically interlocking teeth 22 of aluminum and magnesium.

In another embodiment, the method includes using friction stir-welding to join the rim 12 and the disk 14. Friction stir-welding is a method used to join metal workpieces. The method generally uses a cylindrical, shouldered tool with a profiled pin that is rotated at the joint line between two workpieces while being traversed along the joint line. The rotary motion of the tool generates frictional heat which serves to soften and plasticize the workpieces. This softened material, contributed by both workpieces, intermingles and is consolidated by the pin shoulder. As the pin moves laterally the frictional heating is reduced and the softened material hardens and intermixes, creating a bond between the two workpieces. For example, the magnesium rim 12 may be friction stir-welded to the aluminum disk 14. During the process of friction stir-welding, the interface 18 of the first portion and the second portion may be formed and include a metallurgical bond between the aluminum and magnesium.

The method according to yet another embodiment includes fastening the rim 12 and the disk 14 at the interface 18 with the fastener 24, for example a high-strength aluminum bolt, a coated steel bolt, or a rivet. In another embodiment, the rim 12 and the disk 14 may be bonded at the interface 18 using an adhesive, for example epoxy-based impact-resistant adhesives.

The above description of embodiments of the invention is merely exemplary in nature and, thus, variations thereof are not to be regarded as a departure from the spirit and scope of the invention.

What is claimed is:

1. A wheel comprising:
   a first portion comprising magnesium, wherein the first portion comprises at least a rim;
   a second portion comprising a disk comprising aluminum; and
   an interface where the first portion and the second portion contact each other, and wherein the second portion comprises a layer located over at least a part of the disk and metallurgically bonded to the disk, the layer constituting an axially-outwardly-facing outer surface of the at least part of the disk with respect to an axle hub to which the disk is mounted when the wheel is assembled to a vehicle, and wherein the layer comprises at least one of an Al—Si based alloy, an Al—Mg based alloy, or an Al—Mg—Si based alloy.

2. A wheel as set forth in claim 1 wherein the interface comprises at least one of a metallurgical bond between the first portion and the second portion, a mechanical interlock between the first portion and the second portion, interlocking teeth between the first portion and the second portion, an adhesive to bond the first portion and the second portion together, or a fastener comprising one of a high-strength aluminum bolt, a coated steel bolt, or a rivet.

3. A wheel comprising:
   a rim comprising a first magnesium alloy;
   a disk comprising a second magnesium alloy;
   an interface where the rim and the disk contact each other; and
   a layer located over at least a portion of the disk, wherein the layer constitutes an axially-outwardly-facing outer surface of the at least portion of the disk with respect to an axle hub to which the disk is mounted when the wheel is assembled to a vehicle, wherein the layer is located over all of the portions of the disk that are exposed in the axially-outwardly-facing direction, and wherein the layer comprises an aluminum alloy.

4. A wheel as set forth in claim 3 wherein the layer has a thickness of about 100 μm to about 200 μm.

5. A wheel as set forth in claim 3 wherein the layer comprises at least one of an Al—Si based alloy, an Al—Mg based alloy, or an Al—Mg—Si based alloy.

6. A method comprising:
   providing a disk of a wheel; and
   providing a rim encompassing the disk, attaching the rim to the disk with a fastener comprising one of a high-strength aluminum bolt, a coated steel bolt, or a rivet,
   forming an interface where the rim contacts the disk, wherein the rim comprises a first magnesium alloy and the disk comprises a second magnesium alloy, and further comprising forming a layer comprising an aluminum alloy located over at least a portion of the disk, the layer constituting an axially-outwardly-facing outer surface of the at least portion of the disk with respect to an axle hub to which the disk is mounted when the wheel is assembled to a vehicle.

7. A method as set forth in claim 6 wherein the disk comprises an aluminum alloy.

8. A method as set forth in claim 6 wherein providing the rim comprises casting the rim around the disk.

9. A method as set forth in claim 6 wherein providing the rim comprises attaching the rim to the disk with an adhesive.

10. A method as set forth in claim 6 wherein providing the rim comprises friction stir welding the rim to the disk.

11. A method as set forth in claim 6 wherein the interface comprises at least one of a metallurgical bond between the rim and the disk, a mechanical interlock between the rim and the disk, interlocking teeth between the rim and the disk, an adhesive to bond the rim and the disk together, or a fastener comprising one of a high-strength aluminum bolt, a coated steel bolt, or a rivet.

12. A method as set forth in claim 6 wherein forming the layer comprises at least one of cold spraying, dipping in a molten aluminum alloy bath, spraying with an aluminum alloy, arc wire spraying, powder spraying, wire flame spraying, plasma spraying, high velocity oxy-fuel spraying, cold spraying, or detonation gun spraying.

13. A method as set forth in claim 6 wherein the layer comprises at least one of an Al—Si based alloy, an Al—Mg based alloy, or an Al—Mg—Si based alloy.

14. A method as set forth in claim 6 further comprising polishing the layer.

* * * * *